United States Patent
Xiao et al.

(10) Patent No.: US 12,155,079 B2
(45) Date of Patent: Nov. 26, 2024

(54) SECONDARY BATTERY

(71) Applicant: JIANGSU CONTEMPORARY AMPEREX TECHNOLOGY LIMITED, Liyang (CN)

(72) Inventors: Haihe Xiao, Ningde (CN); Qingkui Chi, Ningde (CN); Zhisheng Chai, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 268 days.

(21) Appl. No.: 16/658,626

(22) Filed: Oct. 21, 2019

(65) Prior Publication Data

US 2021/0028425 A1 Jan. 28, 2021

(30) Foreign Application Priority Data

Jul. 22, 2019 (CN) .......................... 201921157828.2

(51) Int. Cl.
*H01M 10/658* (2014.01)
*H01M 10/653* (2014.01)
(Continued)

(52) U.S. Cl.
CPC ......... *H01M 50/24* (2021.01); *H01M 10/653* (2015.04); *H01M 10/658* (2015.04);
(Continued)

(58) Field of Classification Search
CPC .. H01M 50/24; H01M 10/653; H01M 10/658; H01M 10/04; H01M 10/0431;
(Continued)

(56) References Cited

U.S. PATENT DOCUMENTS 9,324,988 B2 * 4/2016 Byun .................. H01M 50/583
9,647,252 B2 5/2017 Saruwatari et al.
(Continued)

FOREIGN PATENT DOCUMENTS

CN 104300096 A 1/2015
CN 104868088 A 8/2015
(Continued)

OTHER PUBLICATIONS

The Engineering ToolBox "Metals, Metallic Elements, and Alloys—Thermal Conductivities" obtained Feb. 2023 (Year: 2023).*
(Continued)

*Primary Examiner* — Lingwen R Zeng
(74) *Attorney, Agent, or Firm* — Ladas & Parry LLP

(57) ABSTRACT

The present disclosure relates to the technical field of energy storage devices, and in particular, to a secondary battery. The secondary battery includes a case, an electrode assembly, and a top cover assembly. The case has an opening, and the electrode assembly is received in the case. The top cover assembly includes a top cover plate and an electrode terminal disposed on the top cover plate. The top cover plate is disposed at the opening. The connection sheet is connected between the electrode assembly and the electrode terminal. The secondary battery provided by the present disclosure further includes an insulation thermal-dissipation member disposed between the top cover plate and the connection sheet. The insulation thermal-dissipation member has a thermal conductivity larger than 1 W/(m·k).

9 Claims, 3 Drawing Sheets

(51) Int. Cl.
*H01M 50/119* (2021.01)
*H01M 50/143* (2021.01)
*H01M 50/159* (2021.01)
*H01M 50/172* (2021.01)
*H01M 50/24* (2021.01)
*H01M 50/55* (2021.01)
*B60L 3/00* (2019.01)
*B60L 50/64* (2019.01)
*H01M 10/04* (2006.01)
*H01M 10/613* (2014.01)
*H01M 50/15* (2021.01)
*H01M 50/169* (2021.01)
*H01M 50/474* (2021.01)
*H01M 50/48* (2021.01)
*H01M 50/528* (2021.01)

(52) U.S. Cl.
CPC ....... *H01M 50/119* (2021.01); *H01M 50/143* (2021.01); *H01M 50/159* (2021.01); *H01M 50/172* (2021.01); *H01M 50/55* (2021.01); *B60L 3/0046* (2013.01); *B60L 50/64* (2019.02); *H01M 10/04* (2013.01); *H01M 10/0431* (2013.01); *H01M 10/613* (2015.04); *H01M 50/15* (2021.01); *H01M 50/169* (2021.01); *H01M 50/474* (2021.01); *H01M 50/48* (2021.01); *H01M 50/528* (2021.01); *H01M 2220/20* (2013.01); *Y02E 60/10* (2013.01); *Y02P 70/50* (2015.11); *Y02T 10/70* (2013.01)

(58) Field of Classification Search
CPC ........... H01M 10/613; H01M 2220/20; H01M 50/119; H01M 50/143; H01M 50/15; H01M 50/159; H01M 50/169; H01M 50/172; H01M 50/474; H01M 50/48; H01M 50/528; H01M 50/55; B60L 50/64; B60L 3/0046; Y02E 60/10; Y02P 70/50; Y02T 10/70

USPC ........................................................ 429/120
See application file for complete search history.

(56) References Cited

U.S. PATENT DOCUMENTS

| | | | |
|---|---|---|---|
| 11,133,545 B2* | 9/2021 | Wakimoto | H01M 50/553 |
| 2012/0189884 A1 | 7/2012 | Guen | |
| 2012/0237815 A1* | 9/2012 | Kwak | H01M 10/6551 |
| | | | 429/120 |
| 2013/0344362 A1* | 12/2013 | Raisch | H01M 10/617 |
| | | | 429/93 |
| 2014/0178724 A1* | 6/2014 | Saruwatari | H01M 50/3425 |
| | | | 429/82 |
| 2014/0315056 A1 | 10/2014 | Guen et al. | |
| 2015/0024259 A1* | 1/2015 | Lee | H01M 50/531 |
| | | | 429/178 |
| 2015/0243943 A1* | 8/2015 | Masuda | H01M 10/6553 |
| | | | 429/7 |
| 2016/0099441 A1* | 4/2016 | Harayama | H01M 50/119 |
| | | | 429/158 |
| 2017/0229686 A1* | 8/2017 | Takasu | H01M 10/658 |
| 2019/0189998 A1 | 6/2019 | Muroya et al. | |
| 2019/0273277 A1* | 9/2019 | Wakimoto | H01M 50/574 |
| 2021/0143374 A1* | 5/2021 | Nakayama | H01M 50/543 |

FOREIGN PATENT DOCUMENTS

| | | |
|---|---|---|
| CN | 209843907 U | 12/2019 |
| JP | 2013101773 A | 5/2013 |
| JP | 6048341 B2 * | 12/2016 |
| JP | 2019096430 A | 6/2019 |

OTHER PUBLICATIONS

MatWeb "Overview of materials for Nylon 66, Heat Stabilized" obtained Feb. 2023 (Year: 2023).*
International Search Report, PCT/CN2020/096441, dated Sep. 11, 2020, 5 pages.

* cited by examiner

SECONDARY BATTERY

CROSS-REFERENCE TO RELATED APPLICATIONS

The present application claims priority to Chinese Patent Application No. 201921157828.2 filed on Jul. 22, 2019, the content of which is incorporated herein by reference in its entirety.

TECHNICAL FIELD

The present disclosure relates to the technical field of energy storage devices, and in particular, to a secondary battery.

BACKGROUND

A secondary battery is an important part of a new energy vehicle, and its safety performance is extremely important. With development of new energy vehicles, there is an increasing demand for fast charging.

However, when the secondary battery is in fast charging, a connection sheet thereof needs to withstand a larger current, and thus the connection sheet will generate higher heat. If the heat generated by the connection sheet cannot be timely transferred to the outside, more and more heat will be accumulated inside. As a result, most of the heat will be transferred to an electrode assembly, thereby causing thermal runaway to the electrode assembly and further causing fire and explosion of the secondary battery.

SUMMARY

The present disclosure provides a secondary battery, aiming to solve the problems existing in the related art, thereby improving safety performance of the secondary battery.

An embodiment of the present disclosure provides a secondary battery, including:

a case having an opening;

an electrode assembly received in the case;

a top cover assembly including a top cover plate and an electrode terminal disposed on the top cover plate, the top cover plate being disposed at the opening;

a connection sheet connected between the electrode assembly and the electrode terminal; and an insulation thermal-dissipation member disposed between the top cover plate and the connection sheet, the insulation thermal-dissipation member having a thermal conductivity greater than 1 W/(m·k).

In an embodiment, the insulation thermal-dissipation member is in contact with the top cover plate, and/or the insulation thermal-dissipation member is in contact with the connection sheet.

In an embodiment, the secondary battery further includes an insulation body;

the insulation body is provided with a through hole penetrating the insulation body along a thickness direction of the insulation body; the insulation thermal-dissipation member is received in the through hole.

In an embodiment, a thickness of the insulation thermal-dissipation member is greater than a height of the through hole, and an upper surface and a lower surface of the insulation thermal-dissipation member respectively exceeds an upper surface and a lower surface of the insulation body.

In an embodiment, the thermal conductivity of the insulation thermal-dissipation member is greater than a thermal conductivity of the insulation body.

In an embodiment, the insulation thermal-dissipation member and the insulation body are formed into one piece by injection molding.

In an embodiment, the thermal conductivity of the insulation thermal-dissipation member is greater than 15 W/(m·k).

In an embodiment, the insulation thermal-dissipation member is made of aluminium oxide ceramic material.

In an embodiment, a first heat conductive adhesive is provided between the insulation thermal-dissipation member and the top cover plate, and the insulation thermal-dissipation member is adhered to the top cover plate by the first heat conductive adhesive; and/or a second heat conductive adhesive is provided between the insulation thermal-dissipation member and the connection sheet, and the insulation thermal-dissipation member is adhered to the connection sheet by the second heat conductive adhesive.

In an embodiment, each of the top cover plate and the case is made of a metal material, and the top cover plate is welded to the case.

The technical solution provided by the present disclosure can achieve the following beneficial effects.

The secondary battery provided by the embodiments of the present disclosure includes a case, an electrode assembly, and a top cover assembly. The case has an opening, and the electrode assembly is received in the case. The top cover assembly includes a top cover plate and an electrode terminal disposed on the top cover plate. The top cover plate is disposed at the opening. The connection sheet is connected between the electrode assembly and the electrode terminal. The secondary battery provided by the present disclosure further includes an insulation thermal-dissipation member disposed between the top cover plate and the connection sheet. The insulation thermal-dissipation member has a thermal conductivity greater than 1 W/(m·k). With the insulation thermal-dissipation member, when the overcurrent is large, the heat generated by the connection sheet can be conducted timely to the top cover plate through the insulation thermal-dissipation member, and can also be further conducted to the case, thereby achieving heat dissipation. This can prevent thermal runaway inside the secondary battery, thereby improving safety performance of the secondary battery.

It should be understood that the foregoing general description and the following detailed description are merely exemplary and are not intended to limit the present disclosure.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. It should be noted that the drawings described as follows are merely part of the embodiments of the present disclosure, other drawings can also be acquired by those skilled in the art without paying creative efforts.

REFERENCE SIGNS

Figure 1:
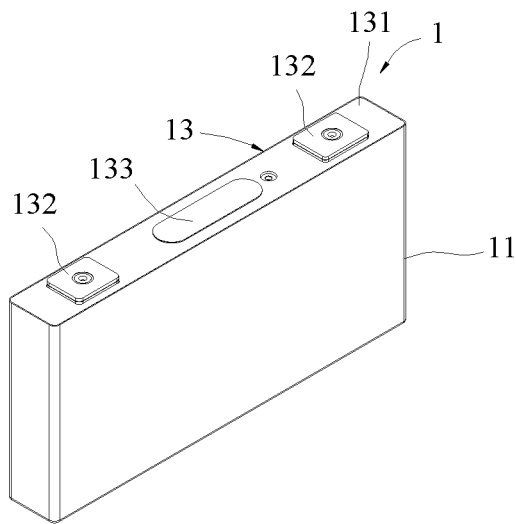
FIG. 1 is a schematic diagram of a structure of a secondary battery according to an embodiment of the present disclosure.

1—secondary battery;
11—case;
12—electrode assembly;
121—electrode tab;
13—top cover assembly;
131—top cover plate;
132—electrode terminal;
133—vent assembly;
14—connection sheet;
15—insulation thermal-dissipation member;
16—insulation body; and
161—through hole.

The drawings herein are incorporated into and constitute a part of the present specification, illustrate embodiments of the present disclosure and explain principles of the present disclosure together with the specification.

DESCRIPTION OF EMBODIMENTS

The technical solutions of the present disclosure will be clearly and thoroughly described as follow with reference to the accompanying drawings. It is obvious that the described embodiments are parts of the present disclosure, rather than all embodiments. Based on the embodiments of the present disclosure, all other embodiments obtained by those skilled in the art without paying any inventive efforts shall fall within the protection scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be understood that, the terms such as "upper", "lower", "left", "right" and the like are used to indicate positions shown in the drawing, instead of being construed as limitations of the embodiment of the present disclosure. In addition, when an element is described as being "on" or "under" another element in the context, it should be understood that the element can be directly or via an intermediate element located "on" or "under" another element.

Figure 2:
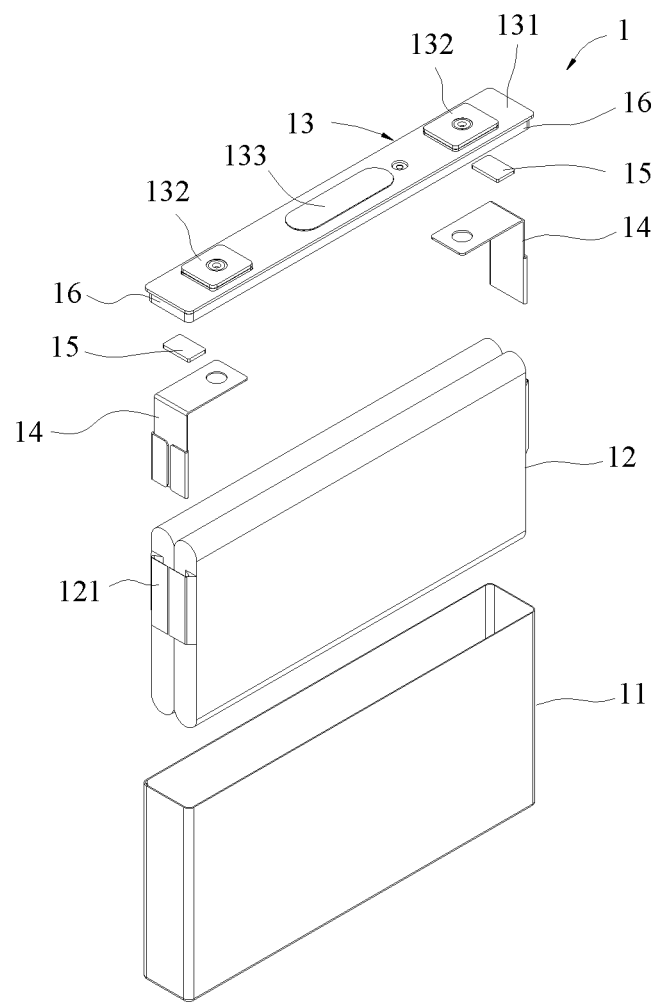
FIG. 2 is a schematic exploded view of a structure of a secondary battery according to an embodiment of the present disclosure.

FIG. 1 is a schematic diagram of a structure of a secondary battery according to an embodiment of the present disclosure, and FIG. 2 is a schematic exploded view of a structure of a secondary battery according to an embodiment of the present disclosure.

As shown in FIG. 1 and FIG. 2, an embodiment of the present disclosure provides a secondary battery 1. The secondary battery 1 includes a case 11, an electrode assembly 12 and a top cover assembly 13.

The case 11 can have a hexahedron shape or another shape, and a receiving cavity is formed inside the case 11 for receiving the electrode assembly 12 and an electrolyte. The case 11 has an opening at one end thereof, in such a manner that the electrode assembly 12 can be placed into the receiving cavity of the case 11 through the opening. A plurality of electrode assemblies 12 can be disposed in the receiving cavity, and the plurality of electrode assemblies 12 is stacked on each other. Here, the case 11 can be made of a metal material such as aluminum, aluminum alloy or nickel plated steel.

The electrode assembly 12 includes an electrode unit. The electrode unit includes a positive electrode, a negative electrode, and a separator. The separator is located between the positive electrode and the negative electrode that are adjacent to each other, so as to separate the positive electrode from the negative electrode.

As a possible design, the positive electrode, the separator and the negative electrode are sequentially stacked and wound so as to form the electrode unit of the electrode assembly 12, that is, the electrode unit is formed as a winding structure. As another possible design, the positive electrode, the separator and the negative electrode are sequentially stacked so as to form the electrode unit of the electrode assembly 12, that is, the electrode unit is formed as a stacking structure. Moreover, the electrode unit has a gap after it is formed, and the electrolyte can enter the electrode unit through the gap, thereby soaking the positive electrode and the negative electrode.

The negative electrode includes a negative current collector (for example, a copper foil) and a negative active material layer (for example, carbon or silicon), with which a surface of the negative current collector is coated. The positive electrode includes a cathode current collector (for example, an aluminum foil) and a positive active material layer (for example, a ternary material, lithium iron phosphate or lithium cobalt oxide), with which a surface of the positive current collector is coated. The positive electrode tab 121 is connected to the positive electrode and protrudes from the electrode unit, and the positive electrode tab 121 can be directly formed by cutting the positive current collector. The negative electrode tab 121 is connected to the negative electrode and protrudes from the electrode unit, and the negative electrode tab 121 can be directly formed by cutting the negative current collector.

As shown in FIG. 1 and FIG. 2, the top cover assembly 13 includes a top cover plate 131 and two electrode terminals 132. The top cover plate 131 is shaped as a flat plate and has substantially the same size and shape as the opening of the case 11. The top cover plate 131 is fixed to the opening of case 11 so as to enclose the electrode assembly 12 and the electrolyte in the receiving cavity of case 11. The top cover plate 131 is made of a metal material. Illustratively, the top cover plate 131 can be selected from the same metal material as a material of the case 11, for example, aluminum, steel or the like. In this embodiment, the top cover plate 131 is provided with two electrode lead-out holes, and the electrode terminals 132 are disposed in the electrode lead-out holes of the top cover plate 131.

One of the two electrode terminals 132 is a positive electrode terminal and the other one is a negative electrode terminal. The positive electrode terminal 132 is electrically connected to the positive electrode tab 121 through a connection sheet 14, and the negative electrode terminal 132 is electrically connected to the negative electrode tab 121 through a connection sheet 14. In other words, the secondary battery 1 further includes a connection sheet 14 connected between the electrode assembly 12 and the electrode terminal 132. The top cover assembly 13 can further include a vent assembly 133 which may be of an existing structure (for example, a rupture disk), and the vent assembly 133 is disposed at a substantially middle position of the top cover plate 131. When gas generated by overcharging, overdischarging or overheating of the secondary battery causes an internal pressure of the secondary battery 1 to be excessively large, the rupture disk in the vent assembly 133 may be broken, so that the gas formed inside the secondary battery 1 can be discharged to the outside, thereby preventing explosion of the secondary battery 1.

As a current demand for fast charging increases, the connection sheet 14 will be subjected to a larger current, and thus the connection sheet 14 will generate more heat.

Figure 3:
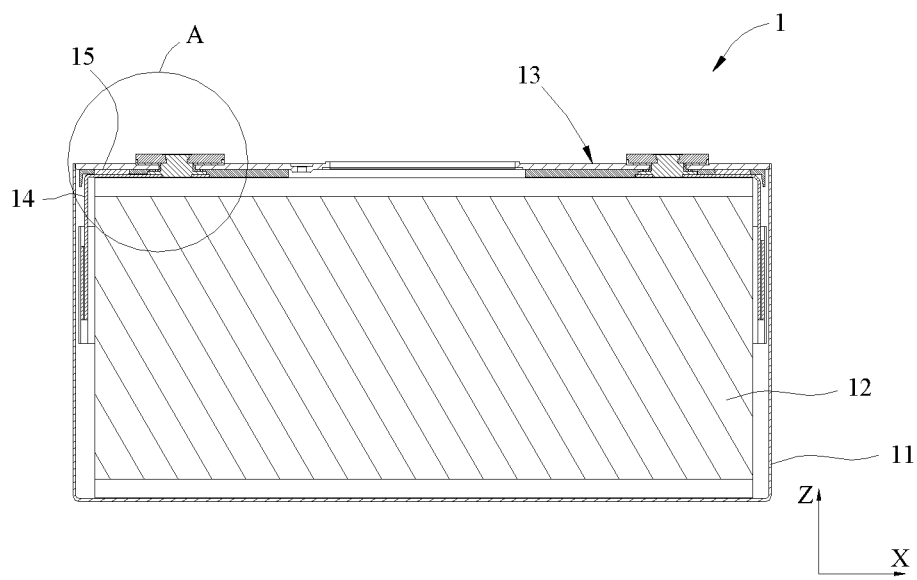
FIG. 3 is a front cross-sectional view of a secondary battery according to an embodiment of the present disclosure.
Figure 4:
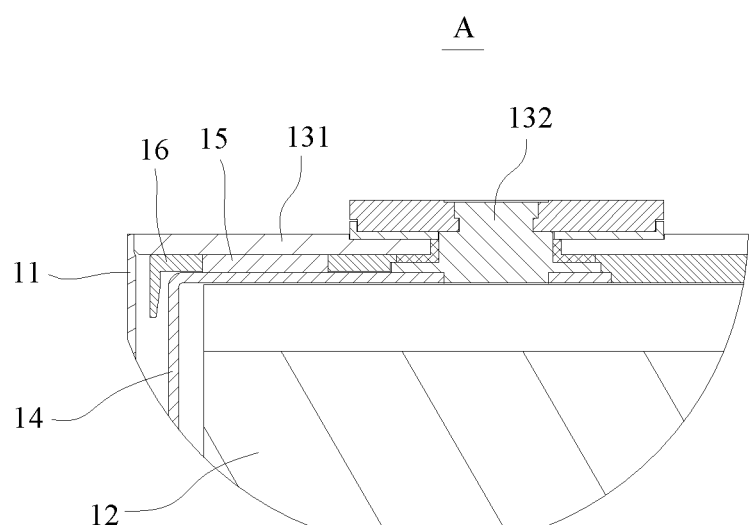
FIG. 4 is an enlarged view of a portion A of FIG. 3.
Figure 5:
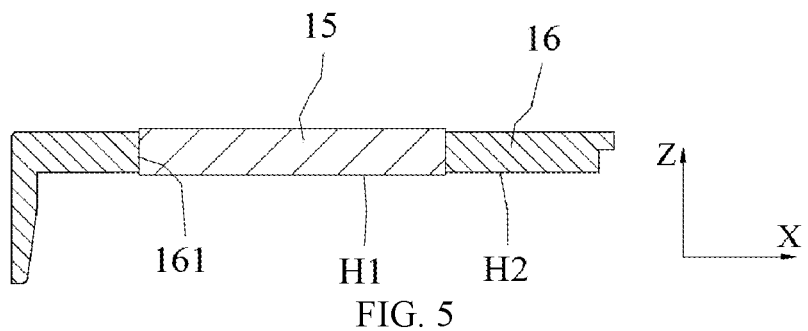
FIG. 5 is a cross-sectional view of a secondary battery according to an embodiment of the present disclosure, in which an insulation thermal-dissipation member is matched with an insulation body.
Figure 6:
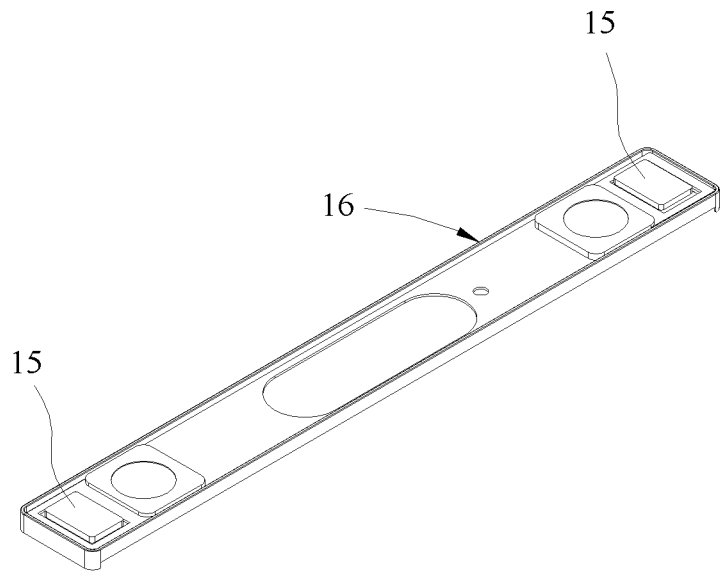
FIG. 6 is a schematic diagram of a secondary battery according to an embodiment of the present disclosure, in which an insulation thermal-dissipation member is matched with an insulation body.
Figure 7:
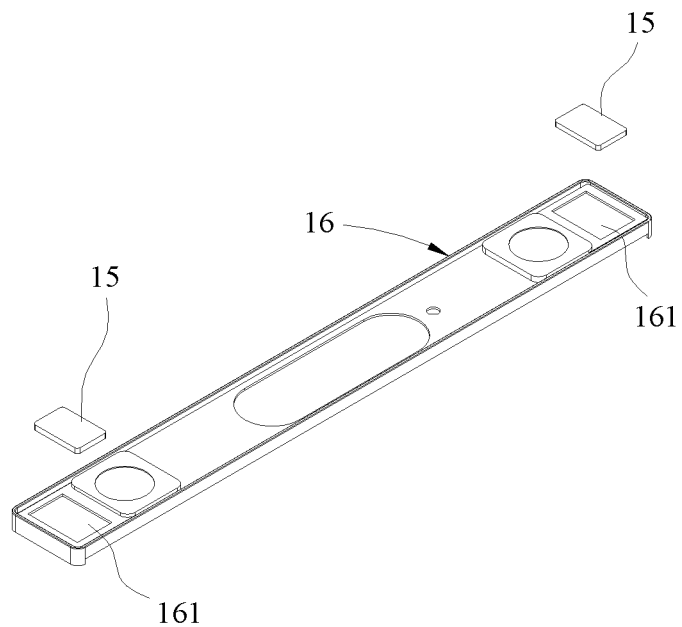
FIG. 7 is an exploded view of a secondary battery according to an embodiment of the present disclosure, in which an insulation thermal-dissipation member is matched with an insulation body.

FIG. 3 is a front cross-sectional view of a secondary battery according to an embodiment of the present disclosure. FIG. 4 is an enlarged view of a portion A of FIG. 3. FIG. 5 is a cross-sectional view of a secondary battery according to an embodiment of the present disclosure, in which an insulation thermal-dissipation member is matched with an insulation body. FIG. 6 is a schematic diagram of a secondary battery according to an embodiment of the present disclosure, in which an insulation thermal-dissipation member is matched with an insulation body. FIG. 7 is an exploded view of a secondary battery according to an embodiment of the present disclosure, in which an insulation thermal-dissipation member is matched with an insulation body.

As shown in FIG. 3 to FIG. 7, in an embodiment of the present disclosure, the secondary battery 1 further includes an insulation thermal-dissipation member 15 disposed between the top cover plate 131 and the connection sheet 14. The insulation thermal-dissipation member 15 has electrical insulation and a large thermal conductivity. In this embodiment, a thermal conductivity of the insulation thermal-dissipation member 15 is larger than 1 W/(m·k).

When the connection sheet 14 generates high heat due to a large overcurrent, heat can be conducted to the top cover plate 131 through the insulation thermal-dissipation member 15 for heat dissipation. Compared with increasing a width dimension or a thickness dimension of the connection sheet 14, this has the better heat dissipation and occupies a smaller space in the secondary battery 1, thereby increasing an energy density of the secondary battery 1. The heat inside the secondary battery 1 is conducted and transmitted timely, thereby greatly reducing a risk of thermal runaway inside the secondary battery 1 and thus improving the safety performance of the secondary battery 1.

In an embodiment, the insulation thermal-dissipation member 15 is in contact with the top cover plate 131, thereby improving the heat conduction effect. The insulation thermal-dissipation member 15 can also be in contact with the connection sheet 14, and the insulation thermal-dissipation member 15 can also be in contact with the top cover plate 131 and the connection sheet 14 at the same time so as to further improve the heat conduction effect.

In an embodiment, the insulation thermal-dissipation member 15 is in a one-piece structure and completely covers a bottom of the top cover plate 131 facing towards the case 11. In this case, when the heat generated by the connection sheet 14 is conducted to the insulation thermal-dissipation member 15, a contact area between the insulation thermal-dissipation member 15 and the top cover plate 131 is large enough, thereby resulting in the better heat conduction effect.

In this embodiment of the present disclosure, both the top cover plate 131 and the case 11 are made of metal materials, and the top cover plate 131 is welded to the case 11. In this way, a part of the heat can be dissipated through the top cover plate 131, and another part of the heat can be conducted to the case 11 through the top cover plate 131 and then dissipated through the case 11. In other words, with the insulation thermal-dissipation member 15, a heat conduction path from the connection sheet 14 to the insulation thermal-dissipation member 15 and then to the top cover plate 131 can be formed, and another heat conduction path from the connection sheet 14 to the insulation thermal-dissipation member 15 and then to the top cover plate 131 and the case 11 can be formed. Thus, the better excellent heat conduction effect can be achieved.

In another embodiment, the secondary battery 1 further includes an insulation body 16. The insulation body 16 is provided with a through hole 161 penetrating the insulation body 16 along a thickness direction (Z direction) of the insulation body 16, and the insulation thermal-dissipation member 15 is received in the through hole 161. The connection sheet 14 is disposed at each of two sides of the electrode assembly 12. Therefore, in this embodiment, two through holes 161 and two insulation thermal-dissipation members 15 can be provided as an example. The two through holes 161 are disposed at positions adjacent to two ends of the insulation body 16 along a length direction (X direction) of the insulation body 16, and the two insulation thermal-dissipation members 15 are respectively disposed in the two through holes 161.

The insulation body 16 can be made of a plastic material, and then the through hole 161 is arranged in such insulation body 16, so that an overall weight of the secondary battery 1 can be reduced. A size and a shape of each of the through hole 161 and the insulation thermal-dissipation member 15 can be determined according to a size and a shape of the connection sheet 14. Illustratively, the through hole 161 has a square shape, and the insulation thermal-dissipation member 15 has a rectangular shape. In other embodiments, the insulation thermal-dissipation member 15 may have other shapes such as a circle shape, a triangle shape or the like. Here, the shape of the through hole 161 matches the shape of the insulation thermal-dissipation member 15.

By providing the insulation body 16 to match the insulation thermal-dissipation member 15, the heat dissipation can be achieved without increasing the size of the connection sheet or providing other components such as a heat dissipation pipe. In this embodiment of the present disclosure, after the insulation body 16 matches the insulation thermal-dissipation member 15, a smaller space inside the secondary battery is occupied and thus the energy density of the secondary battery is increased.

In an embodiment, a thickness of the insulation thermal-dissipation member 15 is larger than a height of the through hole 161. As shown in FIG. 5, along the thickness direction (Z direction) of the insulation body 16, a lower surface H1 of the insulation thermal-dissipation member 15 protrudes from the through hole 161, that is, protruding from a lower surface H2 of the insulation body 16. As an example, an upper surface and the lower surface of the insulation thermal-dissipation member 15 respectively exceed an upper surface and the lower surface of the insulation body 16. In other words, the upper surface of the insulation thermal-dissipation member 15 exceeds the upper surface of the insulation body 16, and the lower surface of the insulation thermal-dissipation member 15 exceeds the lower surface of the insulation body 16.

Thus, even if the upper surface and the lower surface of the formed insulation body 16 have bad flatness, the insulation thermal-dissipation member 15 can be in sufficient contact with the top cover plate 131 and/or the connection sheet 14, so that an optimum heat conduction effect can be achieved. Illustratively, the formed insulation body 16 has uneven upper and lower surfaces, and when the thickness of the insulation thermal-dissipation member 15 is larger than the height of the through hole 161 and the upper and lower surfaces of the insulation thermal-dissipation member 15 respectively exceed the upper and lower surfaces of the insulation body 16, the insulation thermal-dissipation member 15 can be always in contact with the top cover plate 131 and the connection sheet 14, thereby ensuring the heat conduction effect.

In an embodiment, a thermal conductivity of the insulation thermal-dissipation member 15 is larger than a thermal conductivity of the insulation body 16. The insulation thermal-dissipation member 15 and the insulation body 16 can be made of different materials. For example, the insulation body 16 can be made of a high temperature resistant insulation plastic material, such as polyphenylene sulfide PPS, perfluoroalkoxy resin PFA, polypropylene PP or a combination thereof.

When the insulation thermal-dissipation member 15 is relatively fixed to the insulation body 16, they are arranged between the top cover plate 131 and the connection sheet 14. When the connection sheet 14 has a large overcurrent, the generated heat will be conducted to the top cover plate 131 through the insulation thermal-dissipation member 15 and then to the case 11, thereby achieving the better heat dissipation effect.

The insulation thermal-dissipation member 15 and the insulation body 16 can be formed into on piece by injection molding, so as to form a stable connection therebetween. Then, the insulation thermal-dissipation member 15 and the insulation body 16 are arranged between the top cover plate 131 and the connection sheet 14.

The insulation thermal-dissipation member 15 can be embedded in the through hole 161 of the insertion body 16 by matching of dimensions, which will not be further limited herein. Illustratively, a connection between the insulation thermal-dissipation member 15 and the through hole 161 can be achieved by interference fit therebetween.

In order to further improve the heat conduction effect, an insulation heat conductor is made of a material having a thermal conductivity larger than 15 W/(m·k), preferably a ceramic material having a high thermal conductivity, such as an aluminum oxide ceramic. The insulation body 16 can be made of an existing plastic material, so that the heat dissipation effect can be achieved by using the insulating heat conductor while resulting in lightweight of the insulation body 16.

In an embodiment, a first heat conductive adhesive (not shown) is provided between the insulation thermal-dissipation member 15 and the top cover plate 131. The insulation thermal-dissipation member 15 is adhered to the top cover plate 131 by the first heat conductive adhesive, thereby improving connection reliability between the insulation thermal-dissipation member 15 and the top cover plate 131. Moreover, providing the first thermal conductive adhesive can prevent the insulation thermal-dissipation member 15 from being separated from the top cover plate 131, so that the insulation thermal-dissipation member 15 can be always in contact with the top cover plate 131, thereby resulting in the better heat conduction effect. Illustratively, the first heat conductive adhesive can be heat conductive silica gel.

In an embodiment, a second heat conductive adhesive (not shown) is provided between the insulation thermal-dissipation member 15 and the connection sheet 14. The insulation thermal-dissipation member 15 is adhered to the connection sheet 14 by the second heat conductive adhesive, thereby improving connection reliability between the insulation thermal-dissipation member 15 and the connection sheet 14. Moreover, providing the second heat conductive adhesive can prevent the insulation thermal-dissipation member 15 from being separated from the connection sheet 14, so that the insulation thermal-dissipation member 15 can be always in contact with the connection sheet 14, thereby resulting in the better heat conduction effect. Illustratively, the second heat conductive adhesive can be heat conductive silica gel.

In an embodiment, the first heat conductive adhesive and the second heat conductive adhesive can be respectively disposed between the insulation thermal-dissipation member 15 and the top cover plate 131, and between the insulation thermal-dissipation member 15 and the connection sheet 14.

As mentioned above, the secondary battery 1 provided by the embodiments of the present disclosure includes a case 11, an electrode assembly 12 and a top cover assembly 13. The case 11 has an opening, and the electrode assembly 12 is received in the case 11. The top cover assembly 13 includes a top cover plate 131 and an electrode terminal 132 disposed on the top cover plate 131. The top cover plate 131 is disposed at the opening. The connection sheet 14 is connected between the electrode assembly 12 and the electrode terminal 132. The secondary battery provided by the present disclosure further includes an insulation thermal-dissipation member 15 disposed between the top cover plate 131 and the connection sheet 14. The insulation thermal-dissipation member 15 has a thermal conductivity larger than 1 W/(m·k). With the insulation thermal-dissipation member 15, when the overcurrent is large, the heat generated by the connection sheet 14 can be timely conducted to the top cover plate 131 through the insulation thermal-dissipation member 15, and can also be further conducted to the case 11, thereby achieving heat dissipation. This can prevent thermal runaway inside the secondary battery 1, thereby improving safety performance of the secondary battery 1.

The above-described embodiments are merely preferred embodiments of the present disclosure and are not intended to limit the present disclosure. Various changes and modifications can be made to the present disclosure by those skilled in the art. Any modifications, equivalent substitutions and improvements made within the principle of the present disclosure shall fall into the protection scope of the present disclosure.

What is claimed is:

1. A secondary battery, comprising:
a case having an opening at one side;
an electrode assembly received in the case;
a top cover assembly comprising a top cover plate, an electrode terminal disposed in a through hole of the top cover plate, and a vent assembly disposed at a middle section of the top cover plate, wherein the top cover assembly is configured to cover the opening;
a connection sheet having two sections connected at a right angle, a first section is perpendicular to the top cover plate and is inserted into the case to be electrically connected to an electrode tab extended from the electrode assembly, and a second section is parallel to the top cover plate and has a hole to accommodate the electrode terminal when the top cover plate covers the opening;
an insulation body disposed between the second section of the connection sheet and the top cover plate, wherein the insulation body has a first hole to allow the electrode terminal to penetrate through, and a second hole, located further away from the vent assembly than that of the first hole, to accommodate an insulation thermal-dissipation member; and
the insulation thermal-dissipation member disposed between the top cover plate and the second section of the connection sheet in the second hole of the insulation body, wherein the insulation thermal-dissipation member is made of an insulating material having a thermal conductivity greater than 1 W/(m·k) for conducting heat between the top cover plate and the second section of the connection sheet;
wherein a thickness of the insulation thermal-dissipation member is greater than a height of the second hole of the insulation body, and an upper surface and a lower surface of the insulation thermal-dissipation member respectively exceed an upper surface and a lower surface of the insulation body.

2. The secondary battery according to claim 1, wherein the thermal conductivity of the insulation thermal-dissipation member is greater than a thermal conductivity of the insulation body.

3. The secondary battery according to claim 1, wherein the insulation thermal-dissipation member and the insulation body are formed into one piece by injection molding.

4. The secondary battery according to claim 1, wherein the thermal conductivity of the insulation thermal-dissipation member is greater than 15 W/(m·k).

5. The secondary battery according to claim 4, wherein the insulation thermal-dissipation member is made of an aluminum oxide ceramic material.

6. The secondary battery according to claim 1, wherein a first heat conductive adhesive is provided between the insulation thermal-dissipation member and the top cover plate, and the insulation thermal-dissipation member is adhered to the top cover plate by the first heat conductive adhesive.

7. The secondary battery according to claim 6, wherein a second heat conductive adhesive is provided between the insulation thermal-dissipation member and the connection sheet, and the insulation thermal-dissipation member is adhered to the connection sheet by the second heat conductive adhesive.

8. The secondary battery according to claim 1, wherein a second heat conductive adhesive is provided between the insulation thermal-dissipation member and the connection sheet, and the insulation thermal-dissipation member is adhered to the connection sheet by the second heat conductive adhesive.

9. The secondary battery according to claim 1, wherein each of the top cover plate and the case is made of a metal material, and the top cover plate is welded to the case.

* * * * *